(12) United States Patent
Kao

(10) Patent No.: US 9,597,792 B1
(45) Date of Patent: Mar. 21, 2017

(54) HAND TOOL HANGER

(71) Applicant: Jui-Chien Kao, Taichung (TW)

(72) Inventor: Jui-Chien Kao, Taichung (TW)

( * ) Notice: Subject to any disclaimer, the term of this patent is extended or adjusted under 35 U.S.C. 154(b) by 0 days.

(21) Appl. No.: 14/939,907

(22) Filed: Nov. 12, 2015

(51) Int. Cl.
*A47F 7/00* (2006.01)
*B25H 3/04* (2006.01)
*F16B 1/00* (2006.01)

(52) U.S. Cl.
CPC ............ *B25H 3/04* (2013.01); *A47F 7/0028* (2013.01); *F16B 2001/0035* (2013.01)

(58) Field of Classification Search
CPC .. B25H 3/04; B25H 3/003; B25H 3/06; A47F 7/0028; A47F 5/0807
See application file for complete search history.

(56) References Cited

U.S. PATENT DOCUMENTS

| | | | | |
|---|---|---|---|---|
| 4,586,616 A * | 5/1986 | Cooper | ................... | A47J 47/16 211/88.04 |
| 5,301,822 A * | 4/1994 | Coleman | ................. | B25H 3/04 211/70.6 |
| 6,352,229 B1 * | 3/2002 | Adams | ..................... | A47G 1/17 24/67 R |
| 6,571,966 B1 * | 6/2003 | Hsiao | ..................... | A47F 7/0028 206/379 |
| 6,811,127 B1 * | 11/2004 | Shiao | ....................... | B25H 3/04 211/70.6 |
| 7,591,385 B2 * | 9/2009 | Brooks | .................... | B25H 3/04 211/70.6 |
| 7,669,723 B2 * | 3/2010 | Kao | ......................... | B25H 3/04 206/349 |
| 7,717,278 B2 * | 5/2010 | Kao | ......................... | B25H 3/04 206/349 |
| 7,798,336 B2 * | 9/2010 | Shiao | ....................... | B25H 3/04 211/70.6 |
| 7,861,871 B2 * | 1/2011 | Kao | ...................... | A47F 7/0028 206/349 |
| 7,882,965 B1 * | 2/2011 | Kao | ......................... | B25H 3/04 211/106.01 |
| 7,905,354 B1 * | 3/2011 | Geibel | .................. | B25H 3/003 206/350 |
| 7,950,534 B2 * | 5/2011 | Kao | ......................... | B25H 3/04 211/70.6 |
| 7,954,651 B2 * | 6/2011 | Kao | ......................... | B25H 3/04 211/106.01 |
| 8,069,995 B2 * | 12/2011 | Winnard | ................ | B25H 3/003 211/70.6 |

(Continued)

*Primary Examiner* — Leslie A Nicholson, III
*Assistant Examiner* — Kimberley S Wright
(74) *Attorney, Agent, or Firm* — Ming Chow; Sinorica, LLC

(57) ABSTRACT

A hand tool hanger has a track, at least one clamping member, and multiple attraction modules. The track plate has a base, a track formed on the base and a distance formed between a top side and a bottom side of two mounting arms of the track, and a combination portion formed on the base. The at least one clamping member is slidably mounted on the mounting arms of the track. The attraction modules are combined with the track plate. Each attraction module has a positioning frame and a magnetic base. The positioning frame is mounted in the combination portion. The magnetic base is fixed in the positioning recess. The magnetic base has a longitudinal width along a direction of the distance of the track and larger than the distance of the track.

11 Claims, 13 Drawing Sheets

(56) References Cited

U.S. PATENT DOCUMENTS

| | | | | |
|---|---|---|---|---|
| 8,302,785 B2* | 11/2012 | Kao | A47F 5/0846 | 211/70.6 |
| 8,302,786 B2* | 11/2012 | Kao | A47F 5/0846 | 211/70.6 |
| 8,813,957 B1* | 8/2014 | Kao | B25H 3/003 | 206/378 |
| 9,126,329 B2* | 9/2015 | Kao | B25H 3/04 | |
| 9,205,552 B2* | 12/2015 | Kao | B25H 3/04 | |
| 2003/0038100 A1* | 2/2003 | Liu | B25H 3/04 | 211/88.01 |
| 2005/0247653 A1* | 11/2005 | Brooks | B25H 3/04 | 211/94.01 |
| 2006/0219647 A1* | 10/2006 | Shih | B25H 3/003 | 211/70.6 |
| 2008/0047911 A1* | 2/2008 | Kao | A47F 5/0838 | 211/70.6 |
| 2008/0251476 A1* | 10/2008 | Shiao | B25H 3/04 | 211/70.6 |
| 2009/0184070 A1* | 7/2009 | Kao | A47F 7/0028 | 211/70.6 |
| 2009/0194494 A1* | 8/2009 | Kao | A47F 5/0838 | 211/70.6 |
| 2010/0072341 A1* | 3/2010 | Kao | B25H 3/04 | 248/340 |
| 2010/0133213 A1* | 6/2010 | Kao | A47F 5/0807 | 211/70.6 |
| 2011/0011813 A1* | 1/2011 | Kao | B25H 3/04 | 211/70.6 |
| 2011/0049069 A1* | 3/2011 | Kao | B25H 3/04 | 211/70.6 |
| 2011/0174752 A1* | 7/2011 | Liao | A47F 5/0838 | 211/70.6 |
| 2011/0192810 A1* | 8/2011 | Kao | B25H 3/028 | 211/70.6 |
| 2011/0233160 A1* | 9/2011 | Chen | B25H 3/06 | 211/70.6 |
| 2012/0111814 A1* | 5/2012 | Kao | A47F 5/0846 | 211/70.6 |
| 2012/0152871 A1* | 6/2012 | Kao | A47F 5/0846 | 211/70.6 |
| 2013/0037498 A1* | 2/2013 | Kao | B25H 3/04 | 211/59.2 |
| 2013/0153521 A1* | 6/2013 | Kao | B25H 3/04 | 211/70.6 |
| 2013/0306581 A1* | 11/2013 | Kao | A47B 81/00 | 211/49.1 |
| 2015/0034572 A1* | 2/2015 | Kao | B25H 3/04 | 211/13.1 |
| 2015/0122750 A1* | 5/2015 | Kao | B25H 3/04 | 211/13.1 |
| 2015/0202767 A1* | 7/2015 | Kao | F16M 13/022 | 211/70.6 |
| 2016/0031074 A1* | 2/2016 | Su | B25H 3/04 | 206/378 |
| 2016/0221178 A1* | 8/2016 | Hsieh | F16M 13/022 | |

* cited by examiner

HAND TOOL HANGER

BACKGROUND OF THE INVENTION

1. Field of the Invention

The present invention relates to a hanger, and more particularly to a hand tool hanger.

2. Description of Related Art

With reference to FIGS. 12 and 13, a conventional hand tool hanger 90 comprises a track plate 91 and multiple clamping members 92. The track plate 91 comprises a base 911, a track 912, and a combination portion 913. The base 911 is elongated. The track 912 is formed on a front side of the base 911. The combination portion 913 is formed on a rear side of the base 911, and comprises at least one magnetic base 93 and two positioning bases 94 respectively located at two ends of the at least one magnetic base 93. The track plate 91 can be mounted on a tool cabinet via a magnetic force of the at least one magnetic base 93. The clamping members 92 are slidably mounted on the track 912, and are applied for clamping or hanging hand tools.

However, the track 912 and the combination portion 913 are located respectively at the front side and the rear side of the conventional hand tool hanger 90, and a width W1 defined between a top and a bottom of the combination portion 913 is equal to a width W2 defined between a top and a bottom of the track 912, such that a width W3 of the magnetic base 93 that is mounted in the combination portion 913 is smaller than the width W2. Therefore, a region that is defined as where the magnetic base 93 attracts the tool cabinet is smaller than a region that is defined as where the clamping member 92 holds the track 912. When hand tools are hung on the clamping members 92 of the conventional hand tool hanger, a magnetic force of the magnetic base 93 will be smaller than a pulling force by which the hand tools pull the clamping members 92. With reference to FIG. 13, the track plate 91 may be dropped from the tool cabinet easily due to a weight of the hand tools, and cannot be mounted on the tool cabinet firmly.

SUMMARY OF THE INVENTION

The main objective of the present invention is to provide a hand tool hanger to resolve the aforementioned problems.

The hand tool hanger has a track, at least one clamping member, and multiple attraction modules.

The track plate comprises a base, a track formed on a front side of the base and comprising two mounting arms formed on the front side of the base, a distance formed between a top side and a bottom side of the two mounting arms, and a combination portion formed on a rear side of the base. The combination portion comprises a rear opening formed through a rear side of the combination portion, wherein the rear side is opposite the base.

The at least one clamping member is slidably mounted on the mounting arms of the track.

The attraction modules are combined with the track plate, and each attraction module comprises at least one positioning frame and at least one magnetic base. The at least one positioning frame is mounted in the combination portion. The at least one magnetic base is fixed in the at least one positioning frame. Each one of the at least one magnetic base comprises a longitudinal width along a direction of the distance of the track. The longitudinal width is larger than the distance of the track, such that a magnetic force of the at least one magnetic base is larger than a pulling force of the at least one clamping member.

Other objectives, advantages and novel features of the present invention will become more apparent from the following detailed description when taken in conjunction with the accompanying drawings.

DETAILED DESCRIPTION OF PREFERRED EMBODIMENT

With reference to FIGS. 1 to 4, a first preferred embodiment of a hand tool hanger in accordance with the present invention comprises a track plate 10, at least one clamping member 20, and multiple attraction modules 30.

Figure 2:
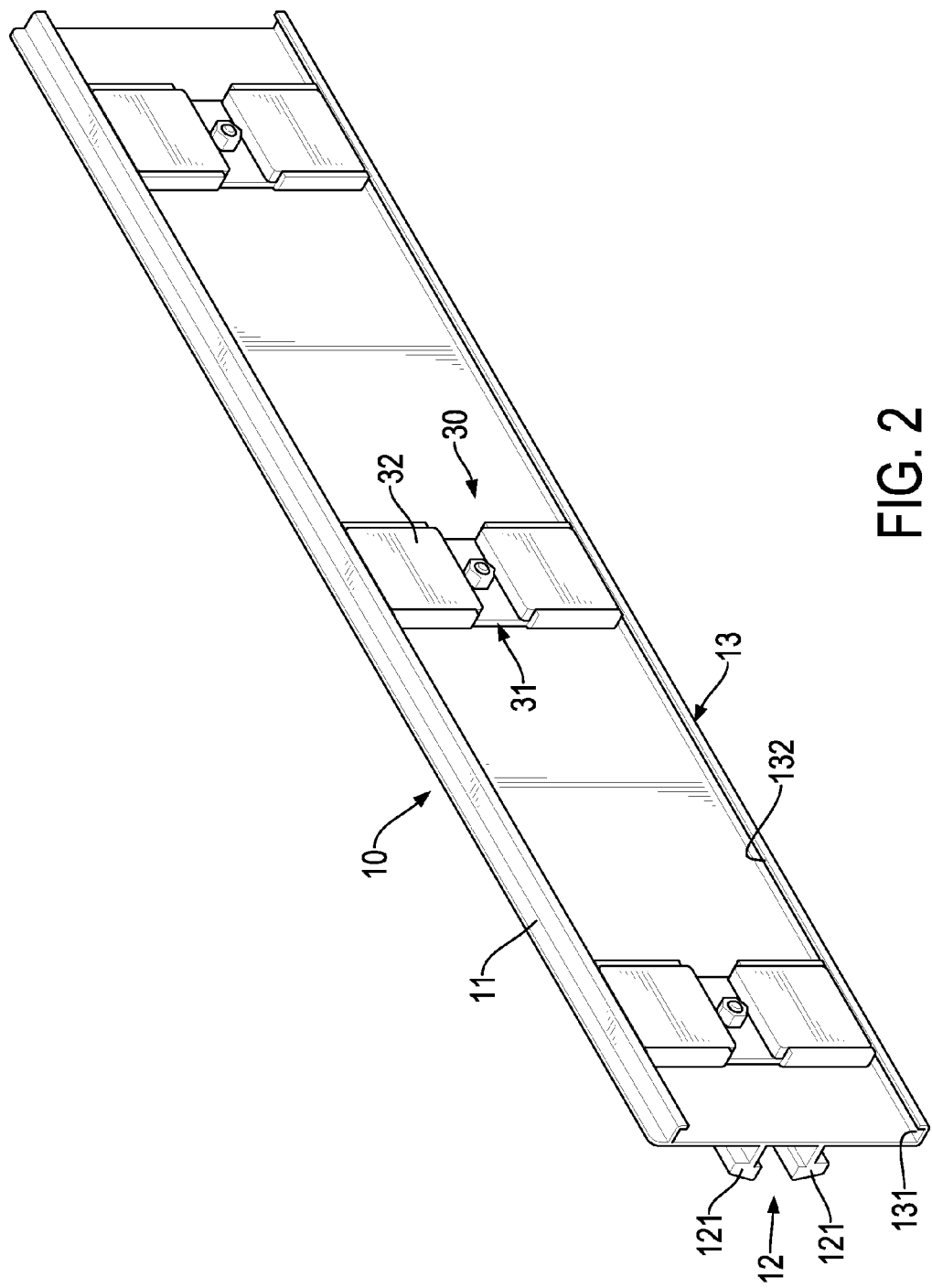
Figure 3:
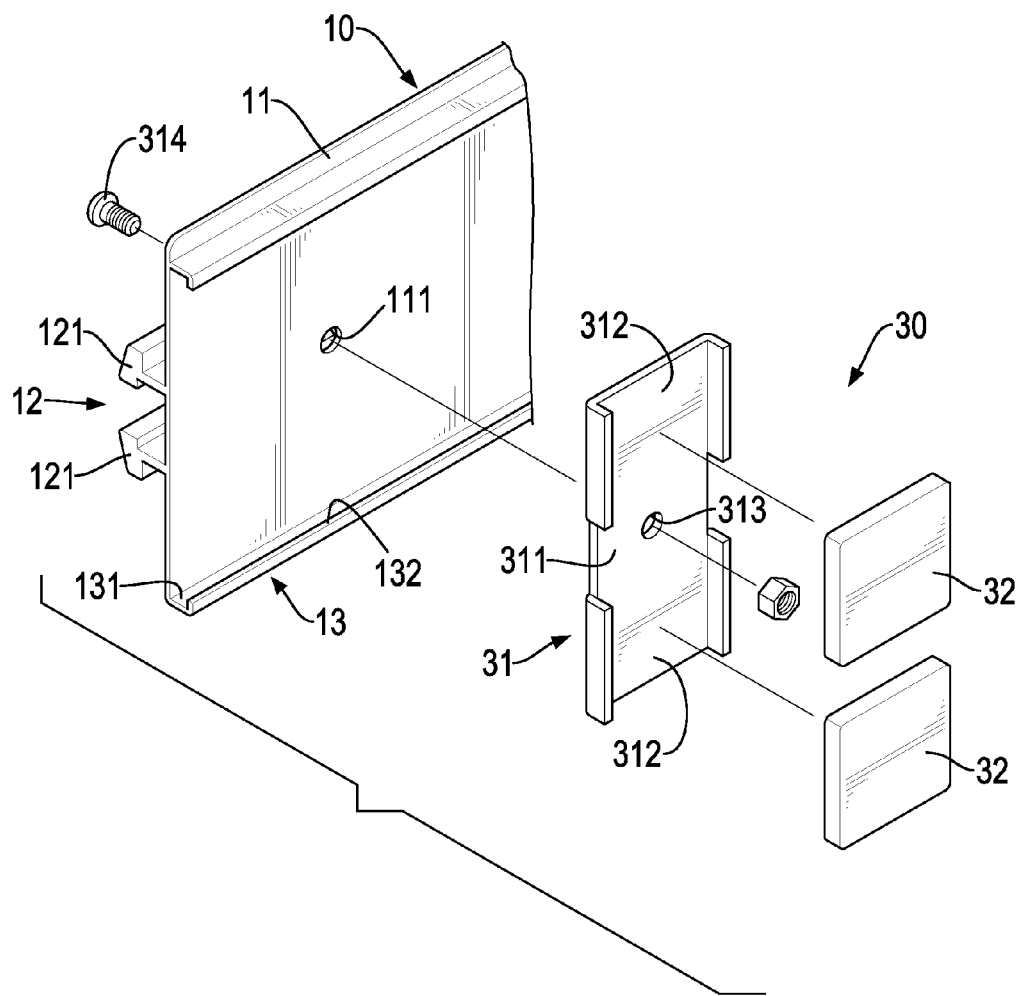
FIG. 3 is an enlarged and exploded perspective view of the hand tool hanger in FIG. 1.
Figure 4:
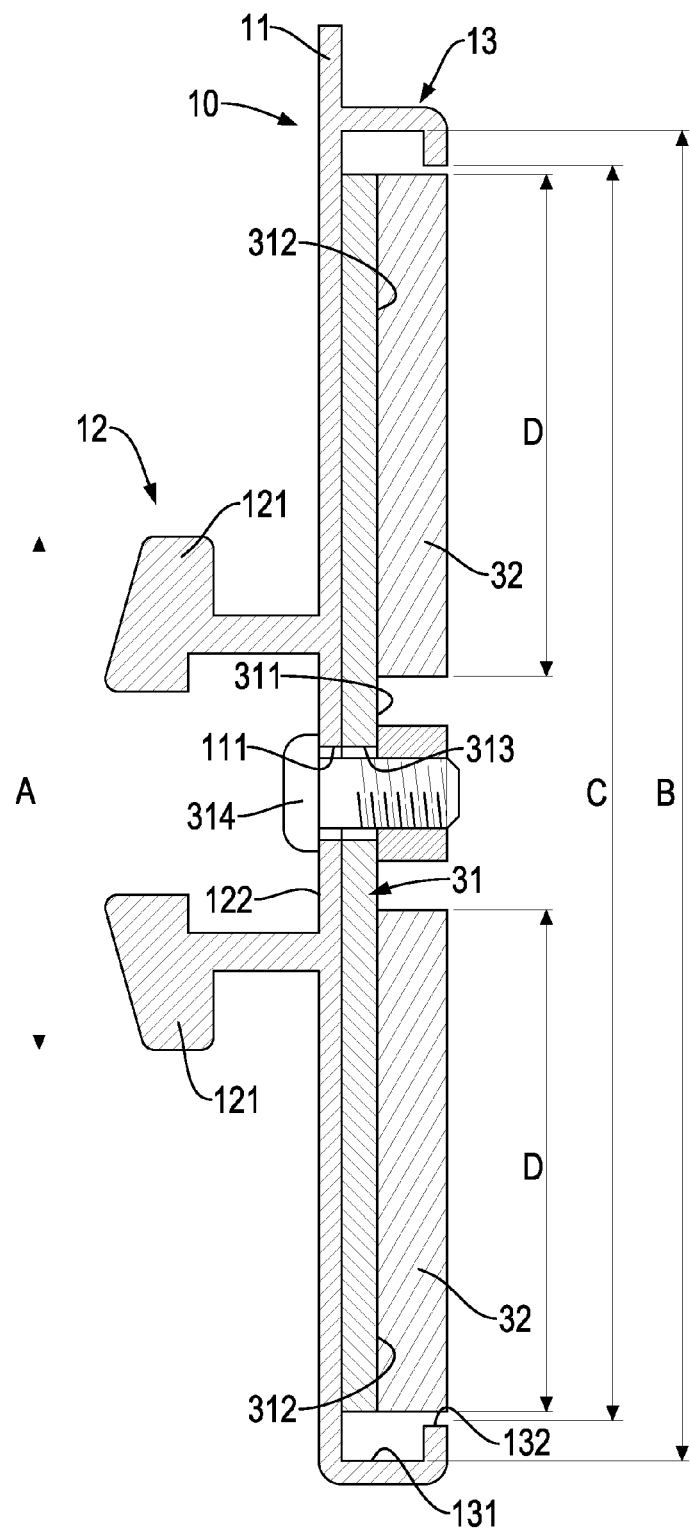
FIG. 4 is an enlarged side view in partial section of the hand tool hanger in FIG. 1.

The track plate 10 is elongated by aluminum extrusion, and comprises a base 11, a track 12, and a combination portion 13. With reference to FIGS. 2 and 3, the base 11 is elongated, and comprises multiple holes 111 formed through the base 11 and disposed along an elongation direction of the base 11. The track 12 is formed on a front side of the base 11 and comprises two mounting arms 121. The mounting arms 121 are formed on the front side of the base 11, and the track 12 comprises a channel 122 formed between the mounting arms 121 and communicating with the holes 111. With reference to FIG. 4, a distance A is formed between a top side and a bottom side of the two mounting arms 121. The combination portion 13 is formed on a rear side of the base 11 and comprises a portion width B, two end openings 131 and a rear opening 132. The portion width B is formed between a top and a bottom of the combination portion 13. The end openings 131 are respectively formed through two ends of the combination portion 13. The rear opening 132 is formed through a rear side of the combination portion 13, wherein the rear side is opposite the base 11. The rear opening 132 comprises an opening width C larger than the distance A but smaller than the portion width B.

Figure 1:
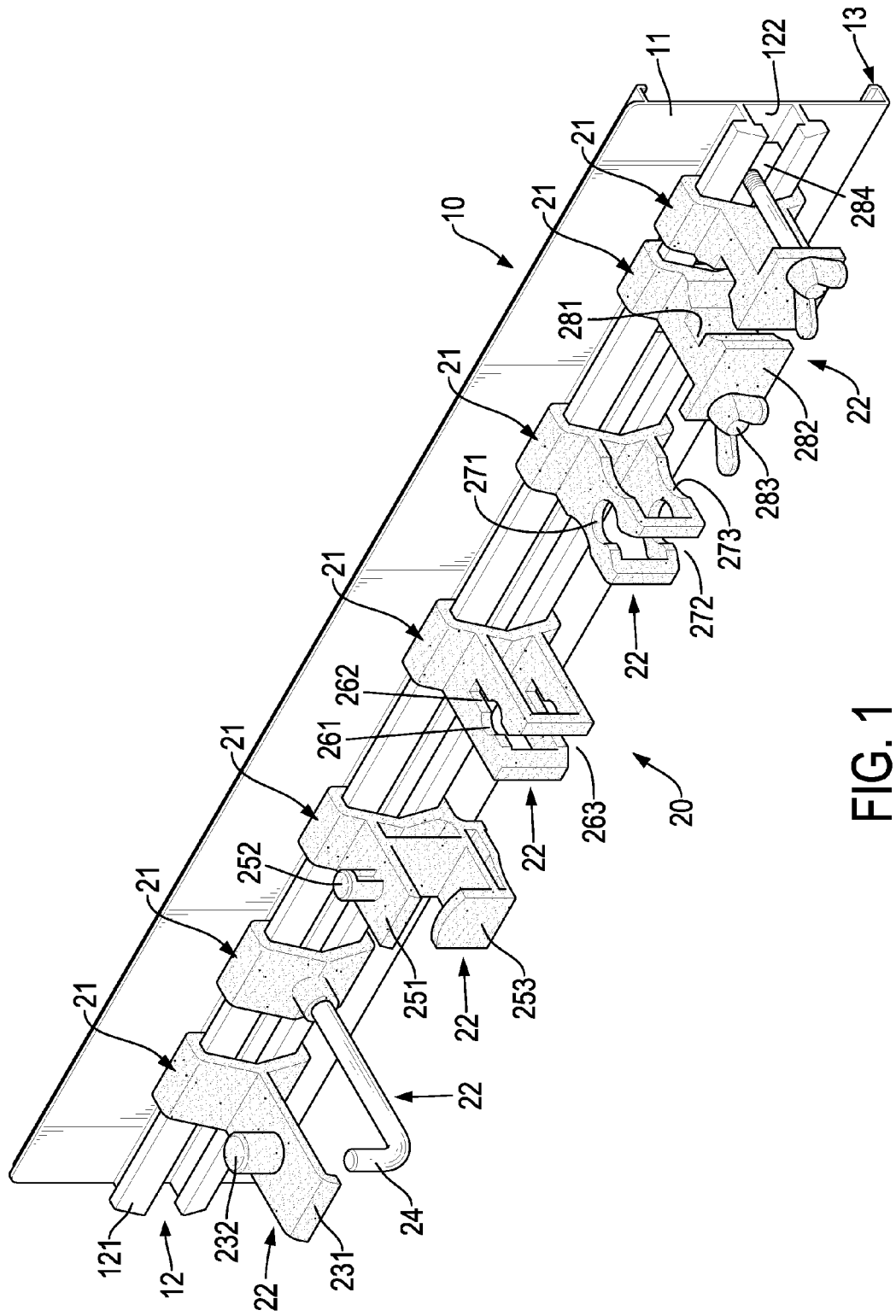
FIGS. 1 and 2 are perspective views of a first preferred embodiment of a hand tool hanger in accordance with the present invention.
Figure 5:
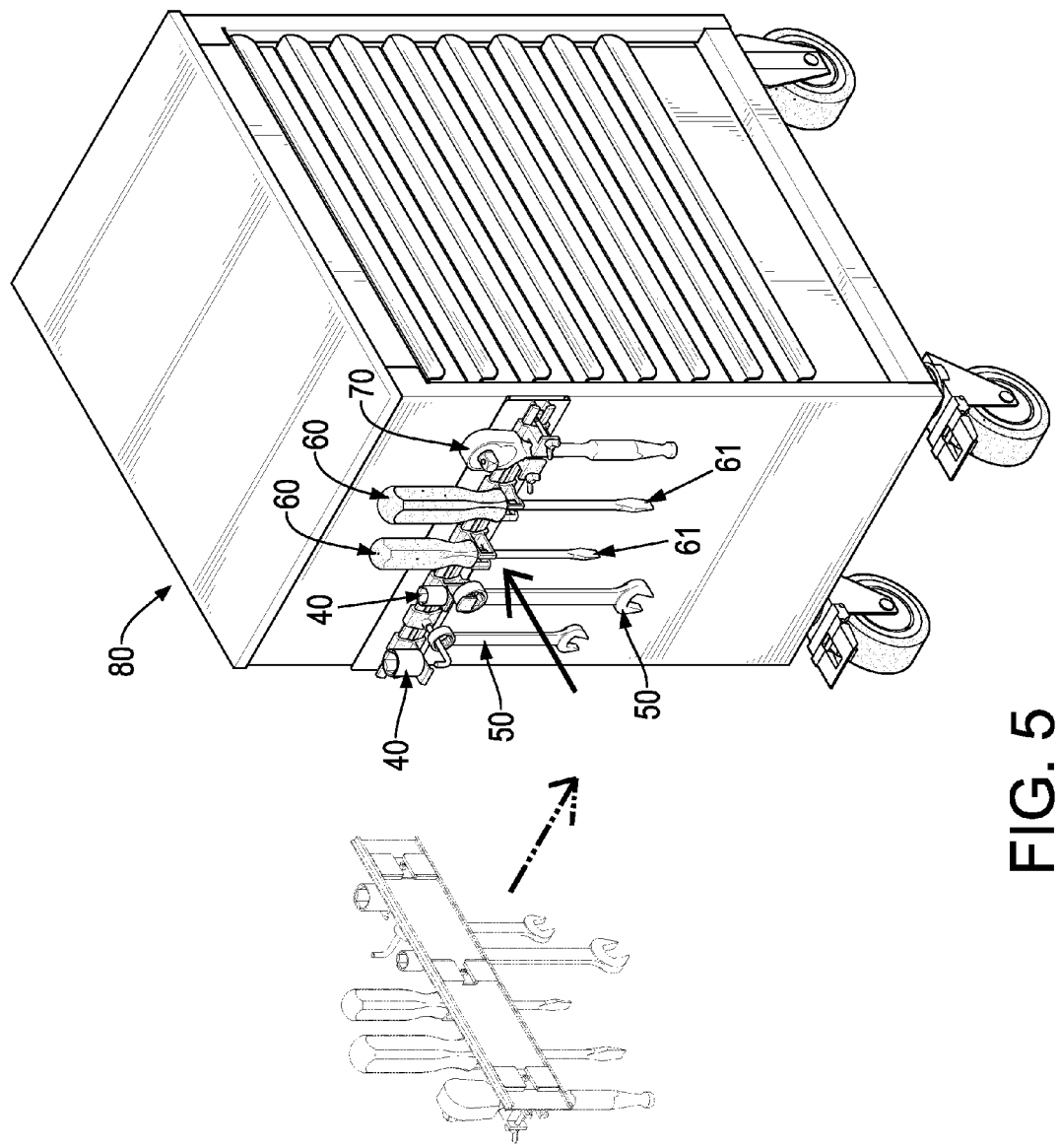
FIG. 5 is an operational perspective view of the hand tool hanger in FIG. 1.

With reference to FIG. 1, the at least one clamping member 20 is slidably mounted on the track 12. Each one of the at least one clamping member 20 has a hooking arm 21 and a hanger base 22. The hooking arm 21 is slidably mounted on the mounting arms 121 of the track 12. The hanger base 22 is formed on a front side of the hooking arm 21 at a position opposite the track 12, and is applied for hanging a hand tool. Preferably, the hanger base 22 may comprise an extension plate 231 and a positioning member 232. The extension plate 231 is formed on the front side of the hooking arm 21. The positioning member 232 is formed on a top of the extension plate 231. With reference to FIG. 5, the positioning member 232 can be combined with a sleeve 40.

Furthermore, the hanger base 22 may comprise a hanging hook 24 mounted on the front side of the hooking arm 21. With reference to FIG. 5, the hanging hook 24 can be combined with a wrench 50.

Furthermore, the hanger base 22 may comprise an extension plate 251, a positioning member 252, and a hanging hook 253. The extension plate 251 is formed on the front side of the hooking arm 21. The positioning member 252 is formed on a top of the extension plate 251. With reference to FIG. 5, the positioning member 252 can be combined with a sleeve 40. The hanging hook 253 is mounted on the front side of the hooking arm 21, and is located below the extension plate 251. The hanging hook 253 can be combined with a wrench 50.

Preferably, the hanger base 22 comprises a tool hole 261, a tool recess 262 and a combined recess 263. The tool hole 261 is formed through a top and a bottom of the hanger base 22. With reference to FIG. 5, the tool hole 261 is combined with a shank 61 of a screwdriver 60. The tool recess 262 is formed through the top and the bottom of the hanger base 22 and communicates with the tool hole 261. The combined recess 263 is formed through the top, the bottom, and a front side of the hanger base 22 opposite the tool recess 262, and communicates with the tool hole 261.

The hanger base 22 may comprise a tool hole 271, a combined recess 272, and two recessed flanges 273. The tool hole 271 is formed through the top and the bottom of the hanger base 22. The combined recess 272 is formed through the top, the bottom, and the front side of the hanger base 22, and communicates with the tool hole 271. The recessed flanges 273 are curved, are respectively formed in a right side and a left side of the hanger base 22, such that the hanger base 22 can be elastically deformed easily because of the recessed flanges 273.

Preferably, one of the at least one clamping member 20 may comprise two clamping portions. Each clamping portion comprises a hooking arm 21 and a hanger base 22. The hooking arm 21 is slidably mounted on the mounting arms 121 of the track 12. The hanger base 22 is formed on a front side of the hooking arm 21, and comprises a clamping body 281, a front plate 282, a fixing unit 283, and a clamping plate 284. The clamping bodies 281 of the two hanger bases 22 are formed in two sides of the two hanger bases 22, and face each other. The front plate 282 is formed on a front of the clamping body 281, and extends laterally. The fixing unit 283 is inserted through the front plate 282 and is inserted into the channel 122 to be located between the mounting arms 121. The clamping plate 284 is mounted in the channel 122, and is combined with the fixing unit 283, so the clamping portion can be mounted on the mounting arms 121 firmly. With reference to FIG. 5, a ratchet wrench 70 is clamped between the clamping bodies 281 of the clamping portions of the clamping member 20.

With reference to FIGS. 2 to 4, the attraction modules 30 are combined with the track plate 10. Each attraction module 30 comprises a positioning frame 31 and two magnetic bases 32. The positioning frame 31 is mounted in the combination portion 13 through the rear opening 132, and comprises a positioning portion 311 and two positioning recesses 312. A positioning hole 313 is formed through the positioning portion 311, and is aligned with one of the holes 111. A combining unit 314 is inserted into and combined with the aligned hole 111 and the positioning hole 313, so the positioning frame 31 is mounted on the combination portion 13. The positioning recesses 312 are recessed in the positioning frame 31 and are respectively located at two opposite ends of the positioning portion 311. The magnetic bases 32 are magnetic, and are respectively fixed in the positioning recesses 312. Each magnetic base 32 has a longitudinal width D that is along a direction of the opening width C. Double of the longitudinal width D is larger than the distance A.

With reference to FIG. 5, in use, multiple hand tools, such as the sleeve 40, the wrench 50, the screwdriver 60 or the ratchet wrench 70 can be held on hanger bases 22 that comprise different structures, and be combined with the track plate 10. Furthermore, the hand tool hanger of the present invention can be mounted on another tool cabinet or another display frame easily because the magnetic bases 32 can be attracted on the tool cabinet by a magnetic force, wherein the tool cabinet is made by magnetic metal. Therefore, the hand tool hanger of the present invention can be mounted on the tool cabinet 80 without using bolts.

Furthermore, with reference to FIG. 4, the magnetic bases 32 are respectively located on the top and the bottom of the positioning frame 31, and double of the longitudinal width D is larger than the distance A. When the hand tool hanger of the present invention is mounted on the tool cabinet 80, the magnetic force of the magnetic bases 32 can be larger than a pulling force by which the at least one clamping member 20 pulls the mounting arms 121, so the hand tool hanger can be mounted on the tool cabinet 80 firmly. The track plate 10 of the hand tool hanger of the present invention will not drop due to a weight of the hand tools from the tool cabinet 80.

Figure 6:
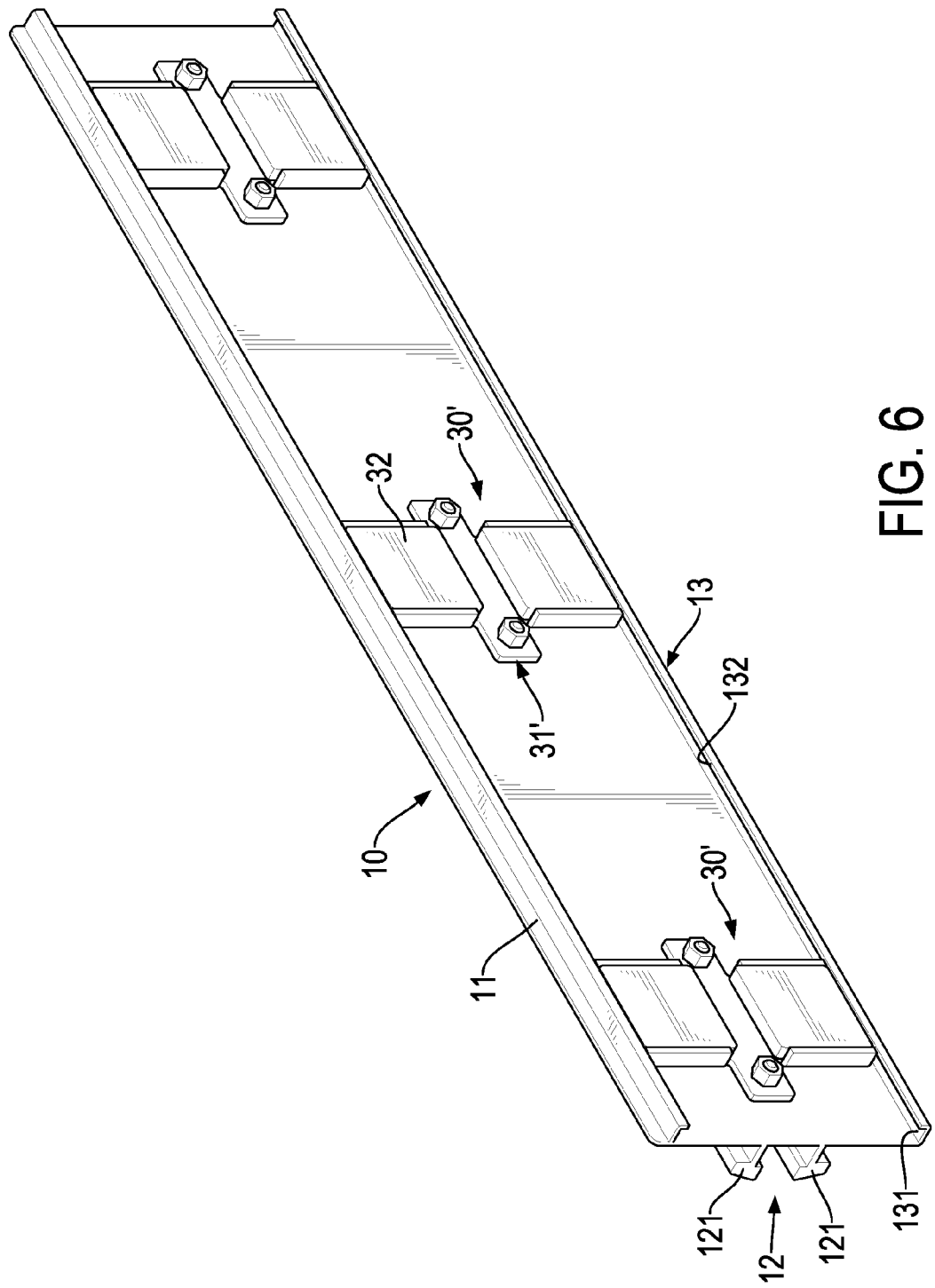
FIG. 6 is a perspective view of a second preferred embodiment of a hand tool hanger in accordance with the present invention.
Figure 7:
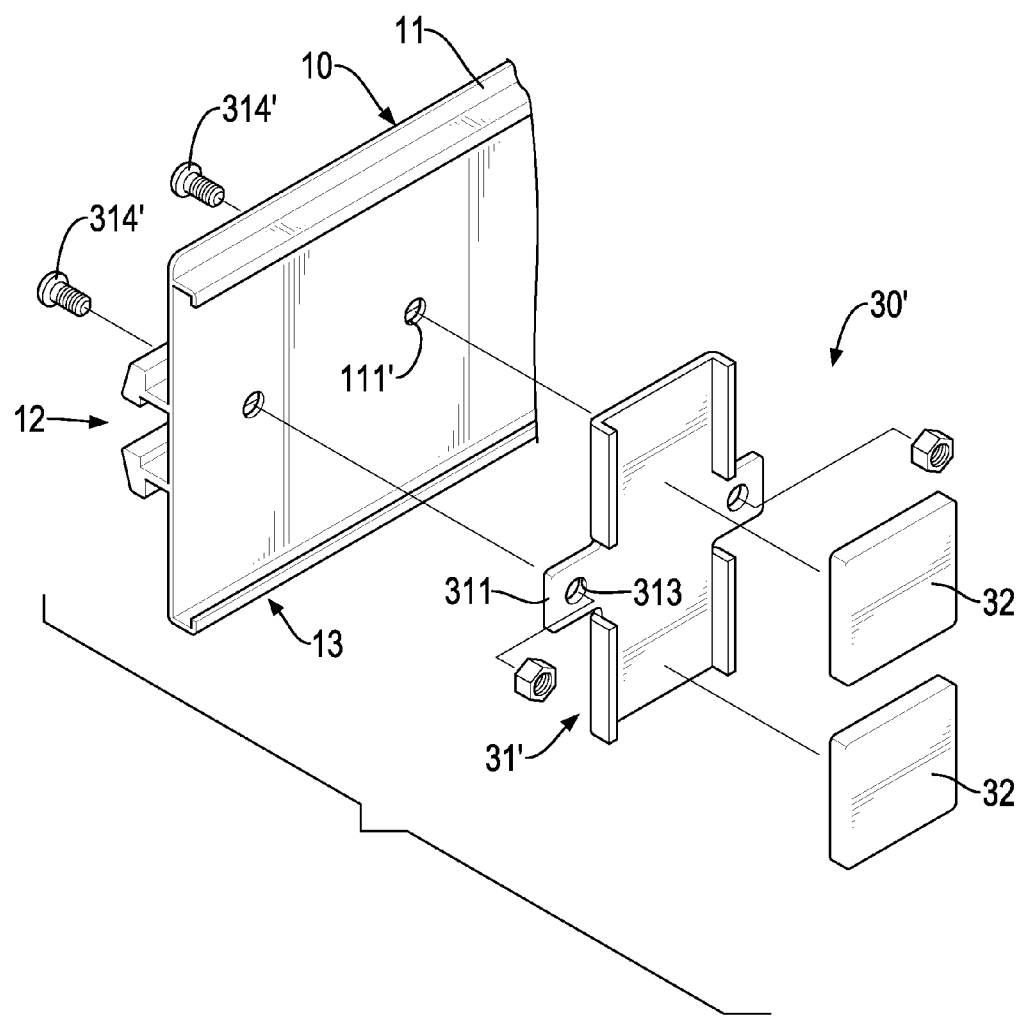
FIG. 7 is an enlarged and exploded perspective view of the hand tool hanger in FIG. 6.
Figure 8:
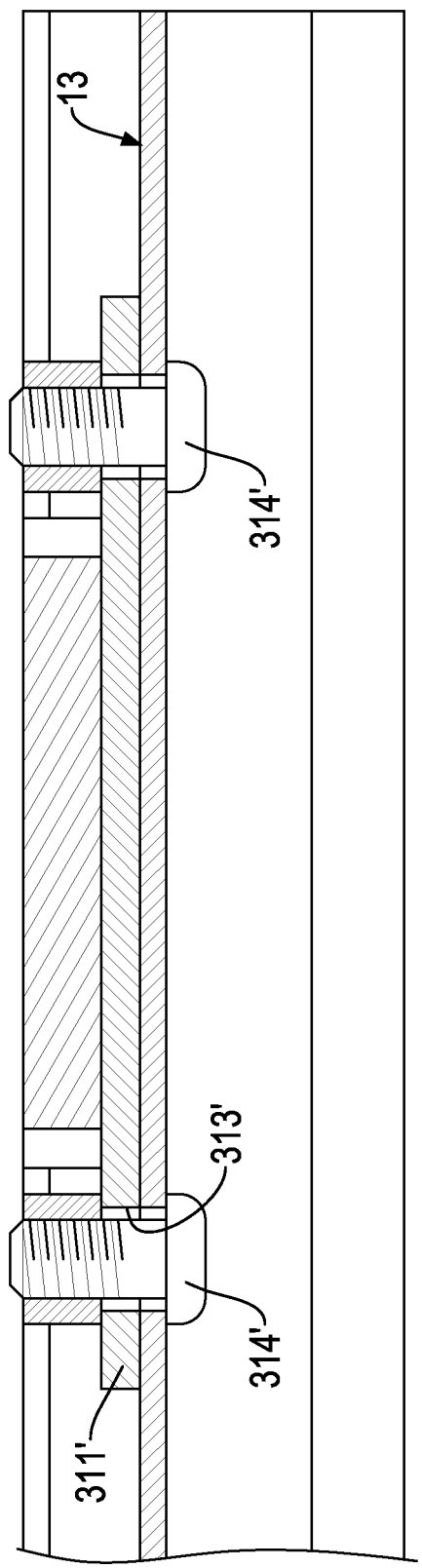
FIG. 8 is an enlarged top view in partial section of the hand tool hanger in FIG. 6.

With reference to FIGS. 6 to 8, a second preferred embodiment of the hand tool hanger in accordance with the present invention is shown. The base 11 comprises multiple pairs of holes 111' at spaced intervals. Each positioning frame 31' comprises two positioning holes 313' formed through the positioning portion 311' at a spaced interval. The positioning holes 313' are respectively aligned with one of the pairs of holes 111'. Two combining units 314' are respectively inserted into and combined with the positioning holes 313' and the holes 111'.

Figure 9:
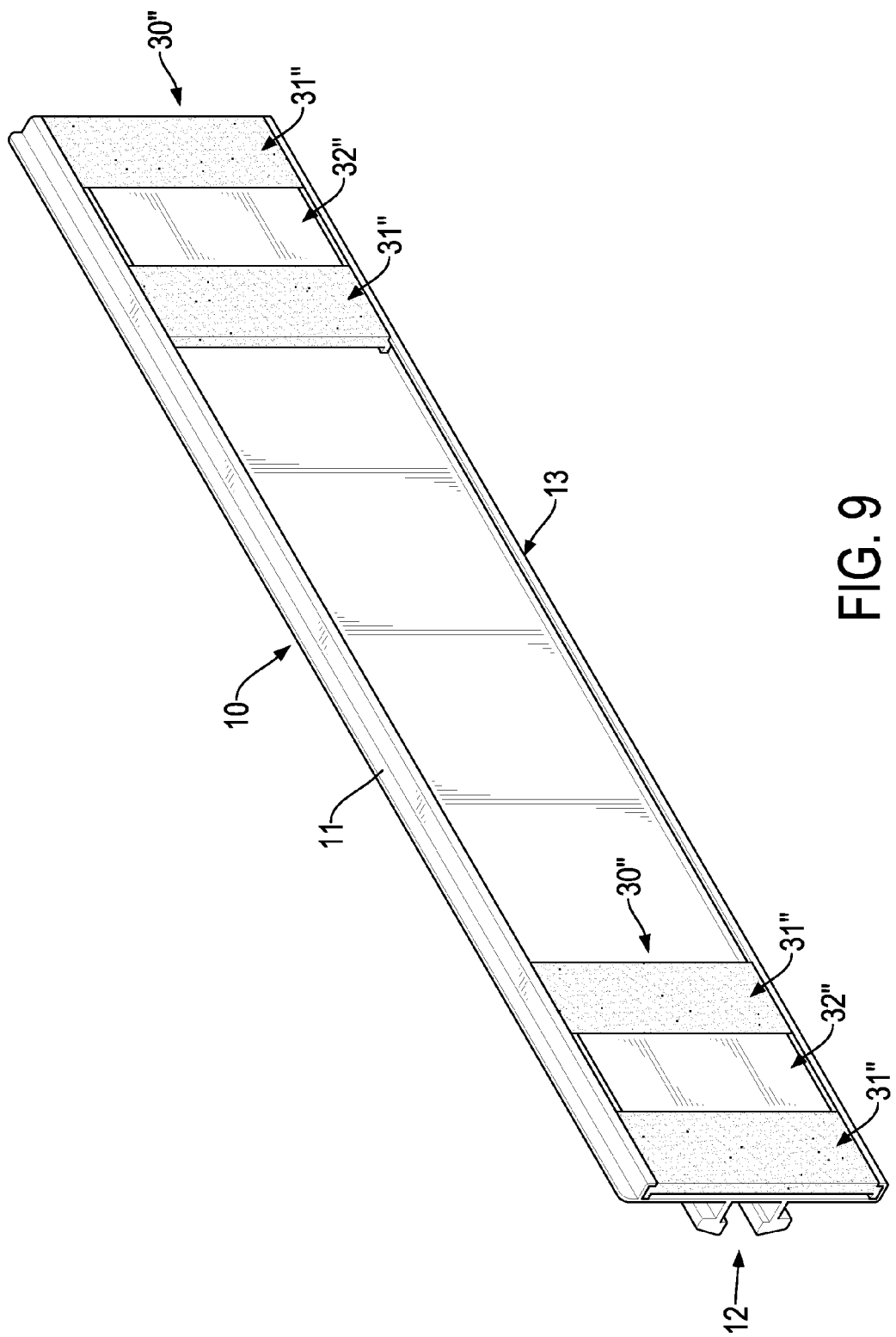
FIG. 9 is a perspective view of a third preferred embodiment of a hand tool hanger in accordance with the present invention.
Figure 10:
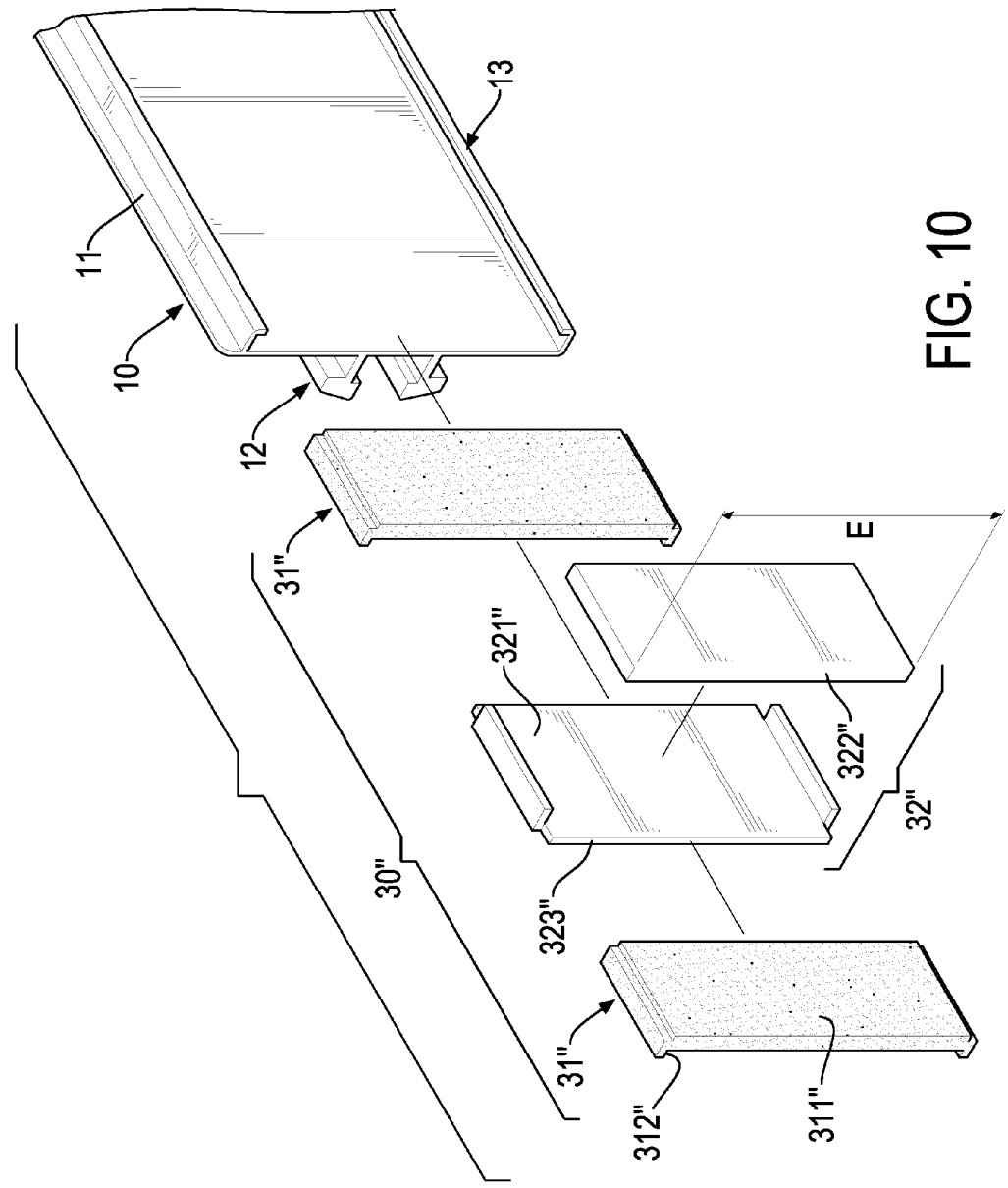
FIG. 10 is an enlarged and exploded perspective view of the hand tool hanger in FIG. 9.
Figure 11:
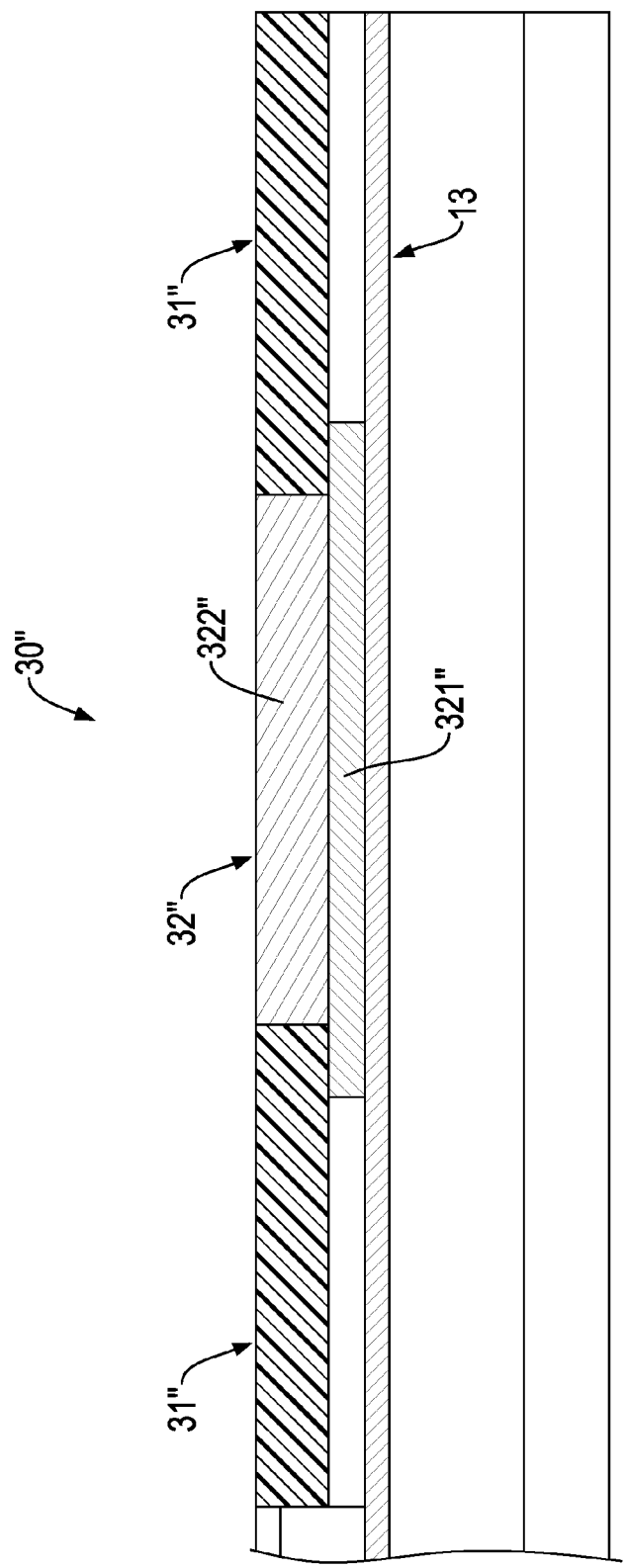
FIG. 11 is an enlarged top view in partial section of the hand tool hanger in FIG. 9.
Figure 12:
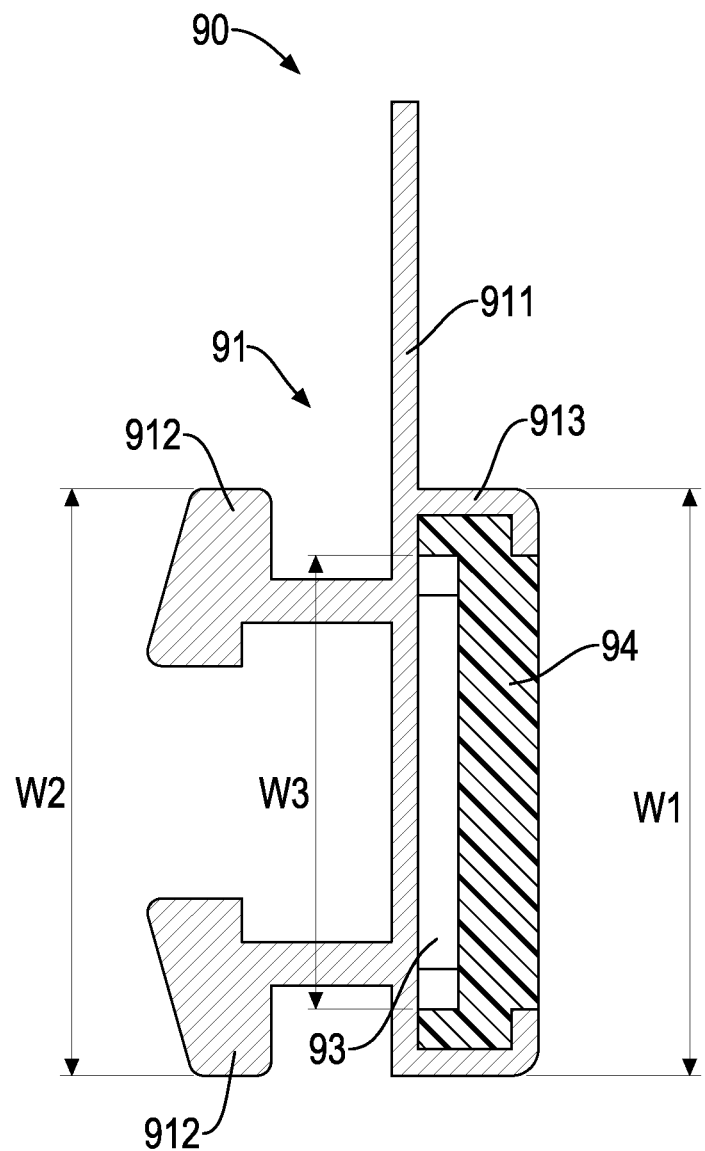
FIG. 12 is a side view in partial section of a conventional hand tool hanger.
Figure 13:
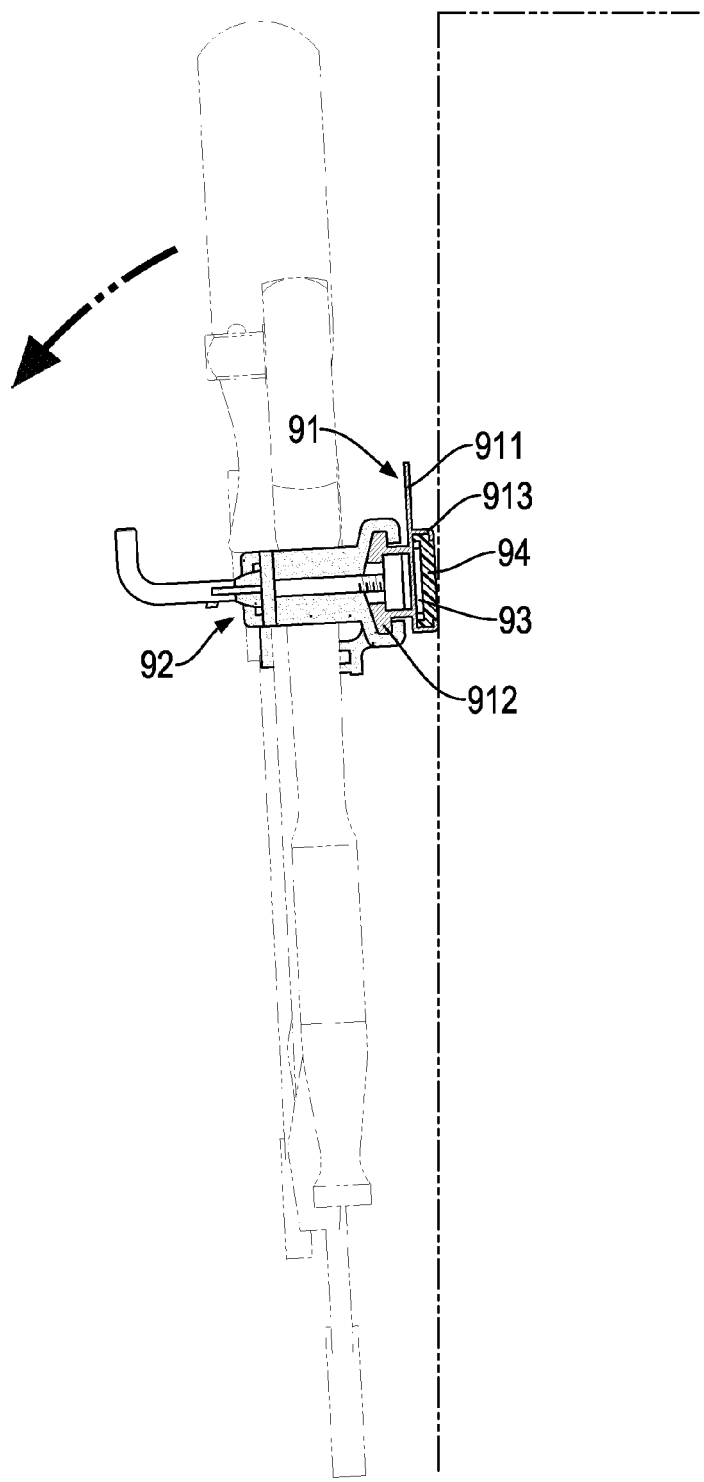
FIG. 13 is an operational side view in partial section of the conventional hand tool hanger in FIG. 12.

With reference to FIGS. 9 to 11, a third preferred embodiment of the hand tool hanger in accordance with the present invention is shown. Each attraction module 30" comprises two positioning frames 31" and a magnetic base 32". Each positioning frame 31" is mounted in the combination portion 13 through one of the end openings 131, and comprises a positioning portion 311" and a positioning recess 312". The positioning portion 311" is mounted in the combination portion 13 tightly. The positioning recesses 312" are formed through two sides of the positioning portion 311". The magnetic base 32" is mounted in the combination portion 13, and abuts the two positioning frames 31". The magnetic base 32" comprises a body 321" and a magnetic block 322". The body 321" comprises two extension plates 323" respectively formed on two sides of the body 321". The extension plates 323" are respectively inserted into the two positioning frames 31" that are adjacent to the magnetic base 32", so the magnetic base 32" can be firmly fixed in the combination portion 13 by the adjacent two positioning frames 31". The magnetic block 322" is fixed in the body 321", and is located in the combination portion 13. The magnetic block 322" comprises a width E that is larger than the distance A.

From the above description, it is noted that the present invention has the following advantages: because the portion width B is larger than the distance A, the two magnetic bases 32, 32", or the magnetic block 322 can be mounted in the combination portion 13. Double of the longitudinal width D is larger than the distance A, or the width E is larger than the distance A, so when the hand tool hanger is mounted on the tool cabinet 80, the magnetic force of the attraction module 30, 30', 30" can be larger than the pulling force of the at least one clamping member 20. The hand tool hanger can be firmly mounted on the tool cabinet 80 by the magnetic force of the attraction module 30, 30', 30", and would not be dropped from the cabinet 80.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hand tool hanger comprising:
   a track plate comprising
      a base;
      a track formed on a front side of the base and comprising two mounting arms formed on the front side of the base;
      a distance formed between a top side and a bottom side of each one of the two mounting arms; and
      a combination portion formed on a rear side of the base and comprising a rear opening formed through a rear side of the combination portion, wherein the rear side of the combination portion is opposite the base;
   at least one clamping member slidably mounted on the mounting arms of the track;
   multiple attraction modules combined with the track plate, and each one of the attraction modules comprising
      at least one positioning frame mounted in the combination portion; and
      at least one magnetic base fixed in the at least one positioning frame, and each one of the at least one magnetic base comprising a longitudinal width along a direction of the distance of the track, and the longitudinal width is larger than the distance of the track, such that a magnetic force of the at least one magnetic base is larger than a pulling force of the at least one clamping member, wherein
   the base comprises multiple holes formed through the base and disposed along an elongation direction of the base;
   the track comprises a channel formed between the mounting arms and communicating with the holes;
   the at least one positioning frames and the at least one magnetic base are implemented as two positioning frames and one magnetic base in each one of the attraction modules, wherein
   each one of the positioning frames is mounted in the combination portion through the rear opening, and comprises
      a positioning portion;
      a positioning hole formed through the positioning portion, and aligned with one of the holes of the base;
      a combining unit inserted into and combined with said one of the holes of the base and the positioning hole to mount the positioning frame on the combination portion; and
      two positioning recesses recessed in the positioning frame and respectively located at two opposite ends of the positioning portion; and
   the magnetic bases are magnetic, and are respectively fixed in the positioning recesses, and double of the longitudinal width of the magnetic bases is larger than the distance.

2. A hand tool hanger comprising:
   a track plate comprising
      a base;
      a track formed on a front side of the base and comprising two mounting arms formed on the front side of the base;
      a distance formed between a top side and a bottom side of each one of the two mounting arms; and
      a combination portion formed on a rear side of the base and comprising a rear opening formed through a rear side of the combination portion, wherein the rear side of the combination portion is opposite the base;
   at least one clamping member slidably mounted on the mounting arms of the track;
   multiple attraction modules combined with the track plate, and each one of the attraction modules comprising
      at least one positioning frame mounted in the combination portion; and
      at least one magnetic base fixed in the at least one positioning frame, and each one of the at least one magnetic base comprising a longitudinal width along a direction of the distance of the track, and the longitudinal width is larger than the distance of the track, such that a magnetic force of the at least one magnetic base is larger than a pulling force of the at least one clamping member, wherein
   the base comprises multiple pairs of holes at spaced intervals;
   the track comprises a channel formed between the mounting arms and communicating with the pairs of holes;
   the at least one positioning frames and the at least one magnetic base are implemented as two positioning frames and one magnetic base in each one of the attraction modules, wherein
   each one of the positioning frames is mounted in the combination portion through the rear opening, and comprises
      a positioning portion;
      two positioning holes formed through the positioning portion, and aligned with one of the pairs of holes of the base;
      two combining units inserted into and combined with said one of the pairs of holes of the base and the positioning holes to mount the positioning frame on the combination portion; and
      two positioning recesses recessed in the positioning frame and respectively located at two opposite sides of the positioning portion; and
   the magnetic bases are magnetic, and are respectively fixed in the positioning recesses, and double of the longitudinal width of the magnetic bases is larger than the distance.

3. A hand tool hanger comprising:
a track plate comprising
a base;
a track formed on a front side of the base and comprising two mounting arms formed on the front side of the base;
a distance formed between a top side and a bottom side of each one of the two mounting arms; and
a combination portion formed on a rear side of the base and comprising a rear opening formed through a rear side of the combination portion, wherein the rear side of the combination portion is opposite the base;
at least one clamping member slidably mounted on the mounting arms of the track;
multiple attraction modules combined with the track plate, and each one of the attraction modules comprising
at least one positioning frame mounted in the combination portion; and
at least one magnetic base fixed in the at least one positioning frame, and each one of the at least one magnetic base comprising a longitudinal width along a direction of the distance of the track, and the longitudinal width is larger than the distance of the track, such that a magnetic force of the at least one magnetic base is larger than a pulling force of the at least one clamping member, wherein
the combination portion comprises two end openings respectively formed through two ends of the combination portion;
the at least one positioning frames and the at least one magnetic base are implemented as two positioning frames and one magnetic base in each one of the attraction modules, wherein
each one of the positioning frames is mounted in the combination portion through one of the end openings, and comprises
a positioning portion mounted in the combination portion tightly;
a positioning recess formed through two sides of the positioning portion;
the magnetic base is mounted in the combination portion, abuts the two positioning frames, and comprises
a body comprising two extension plates respectively formed on two sides of the body, and the extension plates respectively inserted into the positioning recesses of the two positioning frames that are adjacent to the magnetic base, such that the magnetic base is firmly fixed in the combination portion by the two positioning frames; and
a magnetic block fixed in the body, and located in the combination portion, and the magnetic block comprising a width that is larger than the distance.

4. The hand tool hanger as claimed in claim 1, wherein one of the at least one clamping member comprises
a hooking arm slidably mounted on the mounting arms of the track; and
a hanger base formed on a front side of the hooking arm at a position opposite the track.

5. The hand tool hanger as claimed in claim 2, wherein one of the at least one clamping member comprises
a hooking arm slidably mounted on the mounting arms of the track; and
a hanger base formed on a front side of the hooking arm at a position opposite the track.

6. The hand tool hanger as claimed in claim 3, wherein one of the at least one clamping member comprises
a hooking arm slidably mounted on the mounting arms of the track; and
a hanger base formed on a front side of the hooking arm at a position opposite the track.

7. The hand tool hanger as claimed in claim 4, wherein the hanger base comprises a hanging hook mounted on the front side of the hooking arm.

8. The hand tool hanger as claimed in claim 4, wherein the hanger base comprises
an extension plate formed on the front side of the hooking arm;
a positioning member formed on a top of the extension plate; and
a hanging hook mounted on the front side of the hooking arm, and located below the extension plate.

9. The hand tool hanger as claimed in claim 4, wherein the hanger base comprises
a tool hole formed through a top and a bottom of the hanger base;
a tool recess formed through the top and the bottom of the hanger base and communicating with the tool hole; and
a combined recess formed through the top, the bottom, and a front side of the hanger base opposite the tool recess, and communicating with the tool hole.

10. The hand tool hanger as claimed in claim 4, wherein the hanger base comprises
a tool hole formed through the top and the bottom of the hanger base;
a combined recess formed through the top, the bottom, and a front side of the hanger base, and communicating with the tool hole; and
two recessed flanges being curved, respectively formed in a right side and a left side of the hanger base, such that the hanger base can be elastically deformed.

11. The hand tool hanger as claimed in claim 4, wherein one of the at least one clamping member comprises two clamping portions, and each one of the clamping portions comprises
a hooking arm slidably mounted on the mounting arms of the track;
a hanger base formed on a front side of the hooking arm, and comprising
a clamping body, and the clamping bodies of the two hanger bases formed in two sides of the two hanger bases and facing each other;
a front plate formed on a front of the clamping body and extended laterally;
a fixing unit inserted through the front plate and inserted into the channel to be located between the mounting arms; and
a clamping plate mounted in the channel and combined with the fixing unit to mount the clamping portion on the mounting arms firmly.

* * * * *